United States Patent [19]

Yasui et al.

[11] 4,161,571

[45] Jul. 17, 1979

[54] PROCESS FOR PRODUCTION OF THE MALEIC ANHYDRIDE ADDUCT OF A LIQUID POLYMER

[75] Inventors: Seimei Yasui, Takarazuka; Takao Oshima, Sonehigashi, both of Japan

[73] Assignee: Sumitomo Chemical Company, Limited, Osaka, Japan

[21] Appl. No.: 843,311

[22] Filed: Oct. 18, 1977

Related U.S. Application Data

[62] Division of Ser. No. 733,914, Oct. 19, 1976, Pat. No. 4,080,493.

[51] Int. Cl.² .................................................. C08F 8/46
[52] U.S. Cl. ................................... 526/90; 526/192; 526/209; 526/213; 526/193; 526/195; 526/226; 526/233; 526/237; 526/238; 526/272; 525/285; 525/249; 525/251; 525/255; 525/245; 525/248
[58] Field of Search .................. 526/56, 46, 48.1, 48.2, 526/24, 27, 40, 47; 260/879, 880 R

[56] References Cited

U.S. PATENT DOCUMENTS

| | | | |
|---|---|---|---|
| 2,388,477 | 11/1945 | Fryling | 526/205 |
| 2,388,514 | 11/1945 | Zwicker et al. | 526/205 |
| 3,546,184 | 12/1970 | Heidel et al. | 526/56 |
| 3,778,418 | 12/1973 | Nakayama | 526/56 |
| 3,937,677 | 2/1976 | Broecker et al. | 526/56 |
| 4,080,493 | 3/1978 | Yasui et al. | 260/879 |
| 4,082,817 | 4/1978 | Imaizumi et al. | 526/46 |
| 4,091,198 | 5/1978 | Smith | 526/56 |

FOREIGN PATENT DOCUMENTS

| | | | |
|---|---|---|---|
| 2262677 | 2/1975 | France | 526/56 |
| 441989 | 1/1969 | Japan | 526/56 |

*Primary Examiner*—William F. Hamrock
*Attorney, Agent, or Firm*—Birch, Stewart, Kolasch and Birch

[57] ABSTRACT

A process for production of the maleic anhydride adduct of a liquid polymer having a maleic anhydride addition amount of 2 to 70% by weight, which comprises reacting a liquid polymer having a molecular weight of 150 to 5,000 and a viscosity of 2 to 50,000 cp at 30° C. in the presence of at least one compound, as a gelation inhibitor, selected from the group consisting of imidazoles, thiazoles, metallic salts of mercaptothiazoles, urea derivatives, naphthylamines, nitrosamines, iron, iron compounds and specific halogen compounds, said liquid polymer being selected from the group consisting of liquid polybutadienes, liquid polyisoprenes and liquid copolymers comprising units of butadiene or isoprene and units of at least one compound selected from the group consisting of other diolefins, olefins and aromatic vinyl compounds.

16 Claims, No Drawings

PROCESS FOR PRODUCTION OF THE MALEIC ANHYDRIDE ADDUCT OF A LIQUID POLYMER

This application is a divisional, of copending application Ser. No. 733,914, filed on Oct. 19, 1976 now U.S. Pat. No. 4,080,493.

The present invention relates to a process for production of the maleic anhydride adduct of a liquid polymer having a maleic anhydride addition amount of 2 to 70% by weight.

Hitherto, it is well known to prepare the important materials for paints by reacting natural unsaturated oils such as soybean oil, linseed oil or castor oil with maleic anhydride. Many attempts have been made to use substitutes for the natural unsaturated oils in production of the said materials. For example, Japanese Patent Publication No. 21193/1961 discloses the production of the materials for alkyd resins by reacting cyclododecatriene with maleic anhydride. Japanese Patent Publication No. 954/1971 discloses the production of a modified polymer by the addition reaction of maleic anhydride to give low molecular weight polybutadiene having the 1,2-structure in an amount of not less than 80%. Japanese Patent Publication No. 7269/1971 discloses a method for the preparation of a water-soluble resin by neutralizing the said modified polymer or its esterified product with ammonia or an amine.

In the reaction wherein maleic anhydride adds to the polymers resulting from conjugated diolefins, the adducts are generally prepared by heating and, in this reaction, there is usually observed a tendency that, while the addition reaction proceeds, the double bonds of the polymers are crosslinked with other molecules according to the radical addition, whereby the viscosity of the reaction mass increases. When the viscosity is further increased, the reaction mass in the reaction vessel completely forms a gel to make the after-treatment very troublesome. Even if the gel is not formed, the increase of the viscosity in the maleinization causes various difficulties. For instance, the paints prepared by the use of the resulting maleinized products form a coating film having inferior physical properties. Further, for instance, the controls of the conversion of maleic anhydride and of the viscosity of the reaction mass for obtainment of the maleinized products having a suitable viscosity for paints are quite difficult.

Various trails have been made to overcome the said difficulties. For example, Japanese Patent Publication No. 3547/1973 proposes to use cyclic ethers, aldehydes or ketones as a gelation inhibitor in the maleinization reaction. Further, as such gelation inhibitor, there are proposed the uses of amides (Japanese Patent Publication No. 3544/1973), catechols (Japanese Patent Publication (unexamined) NO. 7895/1975), naphthols (Japanese Patent Publication (unexamined) No. 87491/1975), phenothiazines (Japanese Patent Publication (unexamined) No. 132013/1974), etc.

On the other hand, Japanese Patent Publication No. 26870/1968 discloses the preparation of maleinized products by heating a liquid polybutadiene having the cis-1,4 structure in an amount of not less than 50% and a viscosity of 30 to 30,000 cp (centipoise), particularly 80 to 10,000 cp, at 50° C. with maleic anhydride in the presence of a copper compound. This method is characterized in that the viscosity in maleinization is reduced by the existence of the copper compound. Further, Japanese Patent Publication No. 44557/1972 proposes the use of a complex-forming agent such as acetylacetone in such a reaction.

As result of an extensive study seeking a gelation inhibitor which exerts a sufficient effect for preventing the formation of gels in the addition reaction of maleic anhydride to give conjugated diene polymers even when employed in a small amount, it has been found that imidazoles, thiazoles, metal salts of mercaptothiazoles, urea derivatives, naphthylamines, nitrosamines, iron and its compounds, and specific halogen compounds have such an effect and are utilizable as the gelation inhibitor.

The present invention is based on the above finding and provides a process for production of the maleic anhydride adduct of a liquid polymer having a molecular weight of 150 to 5,000 and a viscosity of 2 to 50,000 cps at 30° C. in the presence of at least one compound, as a gelation inhibitor, selected from the group consisting of imidazoles, thiazoles, metal salts of mercaptothiazoles, urea derivatives, naphthylamines, nitrosamines, iron and its compounds and specific hydrogen compounds, said liquid polymer being selected from the group consisting of liquid polybutadienes, liquid polyisoprenes and liquid copolymers comprising units of butadiene or isoprene and units of at least one compound selected from the group consisting of other diolefins, olefins and aromatic vinyl compounds.

Compared with the said gelation inhibitors as disclosed in Japanese Patent Publication Nos. 26870/1968 and 44557/1972, the gelation inhibitors used in the present invention have various advantages. For instance, the gelation inhibitors of this invention can reduce sufficiently and satisfactorily the viscosity of the reaction mass by the use of a smaller amount than that of the known gelation inhibitors. This is advantageous in production of resinous materials to be used for paints since the influence by the gelation inhibitor can be suppressed. Further, for instance, the coloration of the maleinized product caused by the gelation inhibitors of the invention is much less than that caused by the known gelation inhibitors. This apparently contributes to the production of resinous materials of higher quality.

The working mechanism of the gelation inhibitors according to the present invention is still unclear. However, it is presently assumed that they are effective in decomposition and elimination of such radicals as hydroperoxy groups, oxy radicals and polymer radicals present in the molecules of the liquid polymer and/or molecular oxygen existing in the liquid polymer.

As the liquid polymer, there are utilizable liquid polybutadienes, liquid polyisoprenes, liquid butadiene copolymers and liquid isoprene copolymers, which may have a molecular weight of 150 to 5,000 and a viscosity of 2 to 50,000 cp at 30° C., irrespective of the proportion of the cis-, trans-, vinyl- and 3,4-structures constituting the micro structure of the liquid polymer. In case of the liquid polymer being a low molecular weight copolymer of butadiene or isoprene with styrene, it may contain styrene units in a proportion of not more than 40% by weight. The said liquid polymer can be prepared in a conventional procedure, for instance, as disclosed in U.S. Pat. No. 3,428,699.

The addition reaction of maleic anhydride to the liquid polymer in the presence of the gelation inhibitor may be carried out by charging the liquid polymer, maleic anhydride and the gelation inhibitor into a reaction vessel in an optional order and then heating at an elevated temperature until the maleinization is completed. Practically, for instance, the liquid polymer and the gelation inhibitor are first charged into a reaction vessel and kept at a temperature of 10° to 270° C. for a period of 0 to 20 hours. Then, maleic anhydride is added thereto, and the resultant mixture is heated at a temperature of 120° to 230° C., preferably of 170° to 210° C., for a period of 1 to 10 hours in a nitrogen stream under stirring. Alternatively, the liquid polymer, maleic anhydride and the gelation inhibitor may be charged in a reaction vessel from the beginning and then heated at a temperature of 120° to 230° C., preferably of 160° to 190° C., for a period of 1 to 10 hours in a nitrogen stream under stirring. Since the maleinization proceeds almost quantitatively, the recovery of unreacted materials from the reaction mixture is normally unnecessary. The content of the added maleic moiety in the maleinized product may be usually from 2 to 70% by weight. When the maleinized product is blended with an inorganic pigment to prepare a paint composition, the maleic anhydride content is particularly desired to be not less than 2% by weight.

As the gelation inhibitor used in the present invention, there may be exemplified the following compounds:

(1) Imidazoles of the formulae:

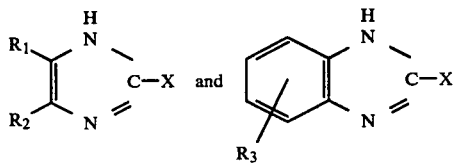

wherein $R_1$, $R_2$ and $R_3$ are each a hydrogen atom, an alkyl group having 1 to 8 carbon atoms or a halogen atom and X is a hydrogen atom, an alkyl group having 1 to 8 carbon atoms, a phenyl group, a mercapto group or a halogen atom. Specific examples are imidazole, 4-methylimidazole, 2-methylimidazole, 2-phenylimidazole, 4-phenylimidazole, 2,4-dimethylimidazole, 4,5-dimethylimidazole, 2,4-diphenylimidazole, 4,5-diphenylimidazole, 2,4,5-triphenylimidazole, 2-bromo-4-methylimidazole, 2-bromo-4-phenylimidazole, 4-bromo-1-methylimidazole, 2,4-dibromoimidazole, 2,4,5-tribromoimidazole, 2,4,5-triiodoimidazole, 2-mercapto-imidazole, 2-mercapto-4-methylimidazole, 2-mercapto-4,5-dimethylimidazole, 2-mercapto-4-phenylimidazole, benzimidazole, 2-methylbenzimidazole, 2-ethylbenzimidazole, 2-vinylbenzimidazole, 2-phenylbenzimidazole, 2-benzylbenzimidazole, 5-methylbenzimidazole, 2-mercaptobenzimidazole, 2-mercapto-5-methylbenzimidazole, etc. Among these imidazoles, mercapto-imidazoles and benzimidazoles are preferred.

(2) Thiazoles of the formulae:

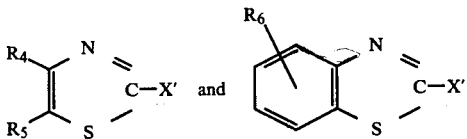

wherein $R_4$, $R_5$ and $R_6$ are each a hydrogen atom, an alkyl group having 1 to 8 carbon atoms, a halogen atom or a phenyl group and X' is a hydrogen atom, an alkyl group having 1 to 8 carbon atoms, a phenyl group, a halogen atom, a mercapto group, a hydroxyl group or a hydroxymethyl group, or a group of the formula: $-SNR_7R_8$ in which $R_7$ and $R_8$ are each a hydrogen atom, an alkyl group having 1 to 8 carbon atoms or an alicyclic group. Specific examples are 2-methylthiazole, 4-methythiazole, 5-methylthiazole, 2,4-dimethylthiazole, 2,5-dimethylthiazole, 4,5-dimethyltiazole, 2,4,5-trimethylthiazole, 2-ethylthiazole, 2-phenylthiazole, 4-phenylthiazole, 5-phenylthiazole, 2-methyl-4-phenylthiazole, 4-methyl-5-phenylthiazole, 4,5-diphenylthiazole, 2-methyl-4,5-diphenylthiazole, 2-methylcyclohexenothiazole, 2-mercaptocyclohexenothiazole, 2-chlorothiazole, 2-bromothiazole, 2-chloro-4-methylthiazole, 4-chloromethylthiazole, 4-chloromethyl-2-methylthiazole, 4-chloromethyl-2-phenylthiazole, 2-hydroxy-4-methylthiazole, 2-methoxy-4-methylthiazole, 2-hydroxy-5-methylthiazole, 2-hydroxy-4,5-diphenylthiazole, 2-hydroxymethyl-4-methylthiazole, 2-aminothiazole, 2-amino-4,5-diphenylthiazole, 2-amino-5-phenylthiazole, benzthiazole, 2-ethylbenzthiazole, 2-methylbenzthiazole, 2-phenylbenzthiazole, 2-chlorobenzthiazole, 2-hydroxybenzthiazole, 2-hydroxy-5-methylbenzthiazole, 2-aminobenzthiazole, 2-amino-6-methylbenzthiazole, 2-mercaptobenzthiazole, etc. When X is a group represented by the formula: $-SNR_7R_8$, the thiazoles are generally called "thiazylsulfenamides," and their examples include N-ethylthiazylsulfenamide, N-propylthiazylsulfenamide, N-butylthiazylsulfenamide, N-amylthiazylsulfenamide, N-octylthiazylsulfenamide, N-cyclohexylthiazylsulfenamide, N-oxydiethylenethiazylsulfenamide, N-ethylbenzthiazylsulfenamide, N-propylbenzthiazylsulfenamide, N-butylbenzthiazylsulfenamide, N-octylbenzthiazylsulfenamide, N-cyclohexylbenzthiazylsulfenamide, N-oxydiethylenebenzthiazylsulfenamide and the like. Among the foregoing thiazoles, benzthiazoles are particularly preferred.

(3) Metal salts of mercaptothiazoles of the formula:

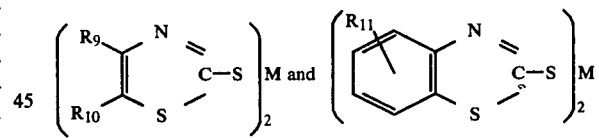

wherein $R_9$, $R_{10}$ and $R_{11}$ are each a hydrogen atom, an alkyl group having 1 to 8 carbon atoms, a halogen atom or a phenyl group and M is zinc, aluminum, magnesium or calcium. Specific examples include zinc salts, calcium salts, magnesium salts and aluminum salts of 2-mercaptothiazole, 2-mercapto-4-methylthiazole, 2-mercapto-5-methylthiazole, 2-mercapto-4,5-dimethylthiazole, 2-mercapto-4-ethylthiazole, 2-mercapto-4-chlorothiazole, 2-mercapto-4-phenylthiazole, 2-mercapto-4-methyl-5-phenylthiazole, 2-mercaptocyclohexenothiazole, 2-mercaptobenzthiazole and the like. Among these salts, metal salts of benzthiazoles are particularly preferred.

(4) Urea derivatives of the formula:

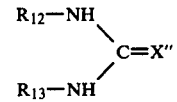

wherein $R_{12}$ and $R_{13}$ are each a hydrogen atom, an alkyl group having 1 to 8 carbon atoms or a phenyl group and $X''$ is an imino group or a sulfur atom. Specific examples include guanidine, diphenylguanidine, dimethylguanidine, diphenylthiourea and the like. The inorganic or organic salts (e.g., hydrochlorides, sulfates, carbonates, acetates, oxalates) of the foregoing compounds as well as the adducts of the foregoing compounds with acetic anhydride, phthalic anhydride, maleic anhydride, etc., are also utilizable.

(5) Naphthylamines

As the naphthylamines, α-naphthylamine, β-naphthylamine, N-phenyl-α-naphthylamine, N-phenyl-β-naphthylamine and N,N'-di-β-naphthyl-p-phenylenediamine are preferred.

(6) Nitrosamines of the formula:

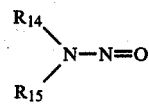

wherein $R_{14}$ and $R_{15}$ are each an alkyl group having 1 to 8 carbon atoms or a phenyl group. Preferred compounds are dimethylnitrosamine, diethylnitrosamine, dipropylnitrosamine, dibutylnitrosamine, dioctylnitrosamine, didodecylnitrosamine, diphenylnitrosamine, ditolylnitrosamine, dicyclohexylnitrosamine, etc.

(7) Iron and its compounds

Among iron and its compounds, preferred are those soluble in organic solvents. However, even the insoluble compounds have an antigelling effect. As the organic salts of iron, there may be exemplified the iron salts of organic carboxylic acids such as iron acetate, iron naphthenate, iron octylate and iron benzoate. As the organic complexes of iron, there may be exemplified the complex between iron chloride and pyridine, tris-(dipyridyl)iron chloride, bis-(ethylenediamine)iron sulfate and the like. The chelate compounds of iron such as bis-(acetylacetonate)iron, bis-(ethylacetoacetate)iron and bis-(dimethylglyoximate)iron may be also employed. Further, inorganic iron compounds such as iron sulfate, iron nitrate, iron oxide, ferrous chloride, ferric chloride, ferrous bromide, ferric bromide, iron iodide and iron powder are utilizable.

(8) Halogen-containing compounds (A) Elements belonging to Group (III), (IV), (V) or (VI) in the Periodic Table are used in the form of chlorides, bromides or iodides, or ether complexes, ester complexes or aldehyde complexes thereof. As the elements, there may be exemplified phosphorus, boron, aluminum, gallium, indium, thallium, titanium, germanium, zirconium, tin, vanadium, arsenic, antimony, tantalum, bismuth, chromium, molybdenum and the like. Specific examples include boron trichloride, aluminum trichloride, gallium trichloride, indium trichloride, titanium tetrachloride, zirconium tetrachloride, tin chloride, antimony trichloride, antimony pentachloride, phosphorus trichloride, tungsten hexachloride, molybdenum tetrachloride, phosphorus pentachloride, phosphorus tribromide, phosphorus pentabromide, arsenic trichloride, arsenic tribromide, antimony tribromide, antimony triiodide, antimony pentabromide, boron tribromide, boron triiodide, aluminum tribromide, titanium tetrabromide, titanium tetraiodide and the like, and ether complexes, ester complexes and aldehyde complexes of the foregoing compounds.

(B) Hydrogen halogenides represented by the formula: $HX'''$ wherein $X'''$ is a chloride, bromine or iodine atom are used. Specific examples include hydrogen chloride, hydrogen bromide and hydrogen iodide.

(C) Alkyl metal halides represented by the formula:

wherein M' is a metal belonging to Group (III) or (IV) of the Periodic Table, R is an alkyl group, Y is a chlorine atom, a bromine atom or an iodine atom, m is a valence of the metal (M') and n is a positive integer smaller than m are used. Specific examples include dimethylaluminum chloride, diethylaluminum chloride, diisobutylaluminum chloride, ethylaluminum sesquichloride, ethylaluminum dichloride, diethylaluminum bromide, diethylaluminum iodide, dimethylboron monochloride, diethylboron monochloride, dibutylboron monochloride, methylboron dichloride, ethylboron dichloride, butylboron dichloride, boron trichloride, dimethylboron monobromide, diethylboron monobromide, dibutylboron monobromide, diphenylboron monobromide, methylboron dibromide, ethylboron dibromide, propylboron dibromide, butylboron dibromide, boron tribromide, dimethylboron monoiodide, diethylboron monoiodide, dipropylboron monoiodide, dibutylboron monoiodide, diphenylboron monoiodide, methylboron diiodide, ethylboron diiodide, butylboron diiodide, boron triiodide, methyltin trichloride, dimethyltin dichloride, ethyltin trichloride, butyltin trichloride, diphenyltin dichloride, trimethyltin bromide and trimethyltin iodide.

(D) Halogenated compounds of aliphatic or alicyclic hydrocarbons having 1 to 8 carbon atoms are used. Specific examples include carbon tetrachloride, chloroform, bromoform, iodoform, dichloroethane, bromochloromethane, dibromoethane, diiodomethane, ethyl bromide, ethyl chloride, isobutyl chloride, isobutyl bromide, n-butyl bromide, tert-butyl bromide, tert-butyl chloride, 2-iodopropane, 2-bromodecane, 1,1,1-trichloroethane, 1,1,2-trichloroethane, pentachloroethane, hexachloroethane, hexachlorocyclopentadiene, 5-chloronorbornane, 5-chloromethylnorbornane, 5-bromonorbornane, 5-bromomethylnorbornane, etc.

(E) Compounds of the formula:

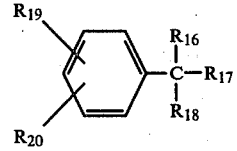

wherein $R_{16}$ is a chlorine atom, a bromine atom or an iodine atom, $R_{17}$ and $R_{18}$ are each a hydrogen atom, a chlorine atom, a bromine atom, an iodine atom, a lower alkyl or a phenyl group and $R_{19}$ and $R_{20}$ are each a hydrogen atom a halogen atom, an alkyl group having 1 to 4 carbon atoms or a halogen substituted alkyl group are used. Specific examples include benzyl chloride, benzyl bromide, benzyl iodide, α-methylbenzyl bromide, α-methylbenzyl chloride, triphenylmethyl chloride, triphenylmethyl bromide, benzotrichloride, 2,4-dichlorobenzotrichloride, benzotribromide, α,2,4-trichlorotoluene, α,3,4-trichlorotoluene, m-xylylene chloride, m-xylylene bromide, o-xylylene bromide, p-xylylene bromide, o-xylylene chloride, p-xylylene chloride, m-xylylene tetrabromide, o-xylylene tetrabromide, p-xylylene tetrabromide, α,α,α,α',α',α'-hexachloro-m-xylene, α,α,α,α',α',α'-hexachloro-o-xylene, benzal chloride, 2,6-dichlorobenzal chloride and the like.

(F) As the alkynyl halides, there may be exemplified propargyl chloride, propargyl bromide, etc.

(G) Ketones containing a chlorine atom or a bromine atom are used. Specific examples include 1,3-dichloroacetone, 1,1,3,3-tetrachloroacetone, bromoacetone, 1,3-dibromoacetone, hexachloroacetone and the like.

(H) Halogen-containing allyl compounds of the formula:

$$R_{21}CH=CHCH_2Y'$$

wherein $R_{21}$ is a hydrogen atom or an aliphatic hydrocarbon group having 1 to 6 carbon atoms and $Y'$ is a chlorine atom, a bromine atom or an iodine atom are used.

Among the gelation inhibitors described above, thiazoles, metal salts of mercaptothiazoles, naphthylamines, and iron and its compounds are especially preferred.

The gelation inhibitor may be used in an amount of 0.001 to 5%, preferably 0.005 to 0.5%, based on the liquid polymer. The gelation inhibitor may be employed as such or in the form of a solution in an organic solvent.

The addition reaction of maleic anhydride to the liquid polymer is usually carried out without any solvents. However, organic solvents may be used, if necessary. Examples of such solvents are aliphatic hydrocarbons (e.g., liquid paraffin, n-paraffin, petroleum benzin), alicyclic hydrocarbons (e.g., cyclohexane, isopropylcyclohexane), aromatic hydrocarbons (e.g., benzene, toluene, xylene, durene), ester compounds (e.g., ethyl acetate, butyl acetate), etc. Other organic solvents such as acetone, methyl ethyl ketone and dioxane are also utilizable.

The maleic anhydride adducts obtained by the present invention can remarkably be accelerated in the air-drying rate by adding a conventional hardening agent such as cobalt naphthenate thereto. Further, polyols, polymercaptanes, polyamines, polyphenols and the like can be used for hardening the coating film.

Practical embodiments of the present invention are illustratively shown in the following examples, which are not however intended to limit the present invention thereto. In these examples, % are usually by weight unless otherwise indicated.

EXAMPLE 1

Into a 300 ml volume flask, 160 g of a liquid polybutadiene having the following physical properties were charged, and a designed amount of the gelation inhibitor as shown in Table 1 was added thereto:

| | |
|---|---|
| Viscosity (cp, 20° C.) | 660 |
| Specific gravity ($d_4^{20}$, g/ml) | 0.904 |
| Iodine value (iodine g/100 g) | 450 |
| Molecular weight (measured by a pressure osmometer) | 1,730 |
| Structure (%) cis-1,4 structure | 75 |
| trans-1,4 structure | 23 |
| vinyl structure | 2 |

After replacing the air in the flask by nitrogen gas, the mixture was heated at 150° C. for 1 hour with stirring. Then, 34 g of maleic anhydride were added thereto, and the maleinization reaction was carried out at 190° C. for 5 hours, during which the reaction mixture was sampled at 3, 4 and 5 hours from the initiation of the reaction and subjected to quantitative measurements of the conversion of maleic anhydride by means of gas chromatography. After completion of the reaction, the produced maleinized polybutadiene was dissolved in xylene to make a solid content of 70% and measured for viscosity at 25° C. by means of the E-type viscometer (manufactured by Tokyo Keiki Co., Ltd.).

The results are shown in Table 1 wherein the results from the maleinization reactions carried out with copper naphthenate as the gelation inhibitor or without any gelation inhibitor are also indicated for comparison.

From Table 1, it is apparent that the gelation inhibitors according to the present invention have a higher effect than copper naphthenate at the same amount used. It is also apparent that the gelation inhibitors according to the present invention do not cause any material reduction of the conversion of maleic anhydride.

Table 1

| Run No. | Gelation inhibitor Name | Amount used (% by weight) | Viscosity in solution (cp, 25° C.) | Conversion of Maleic anhydride (%) 3 hrs. | 4 hrs. | 5 hrs. |
|---|---|---|---|---|---|---|
| 1 | 2-Mercaptobenzthiazole | 0.0300 | 820 | 98.8 | 99.1 | 99.9 |
| 2 | 2-Mercaptobenzimidazole | 0.0300 | 960 | 98.7 | 99.2 | 99.9 |
| 3 | Diphenylguanidine | 0.0300 | 1050 | 98.9 | 99.1 | 99.9 |
| 4 | 2-Mercaptoimidazole | 0.0300 | 930 | 98.9 | 99.1 | 99.9 |
| 5 | 2-Hydroxy-4-methylthiazole | 0.0300 | 1530 | 98.6 | 99.2 | 99.9 |
| 6 | Diphenylthiourea | 0.0300 | 1320 | 98.7 | 99.1 | 99.9 |
| Reference No. 1 | None | — | 4004 | 98.8 | 99.1 | 99.9 |
| Reference No. 2 | Copper naphthenate | 0.0300 | 2960 | 98.7 | 99.1 | 99.9 |

EXAMPLE 2

Into a 300 ml volume flask, 166 g of the liquid polybutadiene as in Example 1 were charged, and a designed amount of the gelation inhibitor as shown in Table 2 was added thereto. After replacing the air in the flask by nitrogen gas, the mixture was heated at 100° C. for 1 hour. Then, 34 g of maleic anhydride were added thereto, and the maleinization reaction was carried out at 190° C. for 5 hours. After completion of the reaction, the produced maleinized polybutadiene was dissolved in xylene to make a solid content of 75% and measured for viscosity at 25° C.

The results are shown in Table 2, from which it is apparent that the gelation inhibitors according to the present invention have an excellent effect.

Table 2

| Run No. | Gelation Inhibitor Name | Amount used (ppm, based on polymer) | Viscosity in solution (cp, 25° C.) | Conversion of maleic anhydride (%) |
|---|---|---|---|---|
| 1 | N-t-Butylbenzthiazylsulfenamide | 100 | 750 | 99.9 |
| 2 | N-Cyclohexylbenzthiazylsulfenamide | 100 | 830 | 99.9 |
| 3 | N-Hydroxydiethylenebenzthiazylsulfenamide | 200 | 660 | 99.9 |
| 4 | Zinc salt of 2-mercaptobenzthiazole | 100 | 600 | 99.9 |
| 5 | Guanidine hydrochloride | 100 | 430 | 99.9 |
| 6 | Diphenylguanidine hydrochloride | 100 | 480 | 99.9 |
| 7 | N-Nitrosodiphenylamide | 100 | 630 | 99.9 |
| Reference No. 1 | None | — | 6800 | 99.9 |
| Reference No. 2 | Copper naphthenate | 300 | 2600 | 99.9 |

EXAMPLE 3

The gelation inhibitors according to the present invention were tested for the antigelling effect on the addition reaction of maleic anhydride to a mixture of a liquid polybutadiene having a high content of the cis-1,4 structure and a liquid polybutadiene having a high content of the 1,2-structure. Said cis-1,4 type liquid polybutadiene used was the same one as in Example 1, and said 1,2-type liquid polybutadiene used was the one having a number average molecular weight of 1,000 and consisting of 92% of the 1,2-structure and 8% of the trans-1,4 structure (trade name "B-1000" manufactured by Nippon Soda Co., Ltd.).

To a 300 ml volume flask equipped with a stirrer were added 83 g of the cis-1,4 type polybutadiene and 83 g of the 1,2-type polybutadiene. After replacing the air in the flask by nitrogen gas, the mixture was heated. When the temperature reached 100° C., 28 g of maleic anhydride and the gelation inhibitor were added thereto, followed by reaction at 190° C. for 5 hours. The conversion of maleic anhydride was quantitatively measured by means of gas chromatography. The viscosity of the resulting maleinized product was determined on the xylene solution having a solid content of 75%.

The results are shown in Table 3, from which it is apparent that the gelation inhibitors according to the present invention have a high effect.

Table 3

| Run No. | Gelation inhibitor Name | Amount used (ppm, based on polymer) | Viscosity in solution (cp, 25° C.) | Conversion of maleic anhydride (%) |
|---|---|---|---|---|
| 1 | N-Phenyl-α-naphthylamine | 200 | 930 | 99.9 |
| 2 | Diphenylguanidine hydrochloride | 200 | 850 | 99.9 |
| 3 | Zinc salt of 2-mercaptobenzthiazole | 100 | 2300 | 99.9 |
| 4 | Guanidine carbonate | 100 | 2080 | 99.9 |
| 5 | N-Nitrosodiphenylamine | 100 | 1900 | 99.9 |
| 6 | N-Cyclohexylbenzthiazylsulfenamide | 100 | 1280 | 99.9 |
| Reference No. 1 | None | — | reaction mass gelled after 2 hrs. at 190° C. reaction stopped | |

EXAMPLE 4

Maleinization reaction was carried out under the same conditions as in Example 1 except that a different gelation inhibitor was used. The resulting maleinized polybutadiene was dissolved in xylene to make a solid content of 70% and subjected to measurement for viscosity at 25° C. by means of the E-type viscometer.

The results are shown in Table 4 wherein the results from the maleinization reactions carried out with acetylacetone, copper naphthenate, hydroquinone or 2,6-di-tert-butoxytoluene as the gelation inhibitor or without any gelation inhibitor are also indicated for comparison.

From Table 4, it is apparent that both hydroquinone and 2,6-di-tert-butoxytoluene exhibit little or no gelation inhibiting effect, while the gelation inhibitors according to the present invention can keep the viscosity fairly low.

Table 4

| | Gelation inhibitor | | Viscosity in solution (cp, 25° C.) | | | Conversion of maleic anhydride (%) | | |
|---|---|---|---|---|---|---|---|---|
| Run No. | Name | Amount used (% by weight) | 3 hrs. | 4 hrs. | 5 hrs. | 3 hrs. | 4 hrs. | 5 hrs. |
| 1 | Hexachloroacetone | 0.021 | 4639 | 6656 | 7475 | 99.2 | 99.9 | 99.9 |

Table 4-continued

| | Gelation inhibitor | Amount used (% by weight) | Viscosity in solution (cp, 25° C.) | | | Conversion of maleic anhydride (%) | | |
|---|---|---|---|---|---|---|---|---|
| Run No. | Name | | 3 hrs. | 4 hrs. | 5 hrs. | 3 hrs. | 4 hrs. | 5 hrs. |
| 2 | Benzotrichloride | 0.037 | 1265 | 1715 | 2355 | 98.9 | 99.4 | 99.9 |
| 3 | Phosphorus trichloride | 0.021 | 904 | 1214 | 1344 | 97.5 | 99.8 | 99.9 |
| 4 | Aluminum trichloride | 0.025 | 563 | 1170 | 1221 | 98.8 | 99.3 | 99.9 |
| 5 | Titanium tetrachloride | 0.027 | 963 | 1114 | 1142 | 98.9 | 99.3 | 99.9 |
| Reference No. 1 | None | — | increase in viscosity | gelation | — | — | — | — |
| Reference No. 2 | Hydroquinone | 0.415 | 15300 | 23000 | gelation | 98.9 | 99.5 | 99.9 |
| Reference No. 3 | 2,6-Di-tert-butoxytoluene | 0.500 | increase in viscosity | — | — | — | — | — |
| Reference No. 4 | Copper naphthenate | 0.021 | 4350 | 6700 | 8630 | 98.6 | 99.1 | 99.9 |
| Reference No. 5 | Acetylacetone | 0.100 | 21320 | 28750 | 36200 | 98.8 | 99.6 | 99.9 |

EXAMPLE 5

To a 200 ml volume three-necked glass flask were charged the gelation inhibitor and 100 g of a liquid polybutadiene having the following physical properties:

| | | |
|---|---|---|
| Viscosity (cp, 30° C.) | | 74 |
| Molecular weight (measured by a pressure osmometer) | | 660 |
| Specific gravity ($d_4^{20}$, g/ml) | | 0.872 |
| Iodine value (Wijs method) | | 461 |
| Micro-structure (%) | cis-1,4 structure | 65.1 |
| | trans-1,4 structure | 27.0 |
| | vinyl structure | 7.9 |

After replacing the air in the flask by nitrogen gas, the mixture was stirred vogorously at 150° C. for 1 hour. Thereafter, a designed amount of maleic anhydride was added thereto, and maleinization was carried out at 190° C. for 5 hours in a nitrogen stream. After completion of the reaction, the reaction product was sampled and tested for solubility in toluene.

The results are shown in Table 5 wherein the results from the maleinization reaction carried out without any gelation inhibitor are also indicated for comparison.

polybutadiene used had the following physical properties:

| | | |
|---|---|---|
| Viscosity (cp, 20° C.) | | 800 |
| Specific gravity ($d_4^{20}$, g/ml) | | 0.898 |
| Iodine value (iodine g/100 g) | | 450 |
| Molecular weight (measured by a pressure osmometer) | | 1,970 |
| Micro-structure (%) | cis-1,4 structure | 79 |
| | trans-1,4 structure | 19 |
| | vinyl structure | 2 |

During the maleinization reaction, samplings were carried out at 3, 4 and 5 hours from the initiation of the reaction, and the quantitative measurements of the conversion of maleic anhydride were carried out by means of gas chromatography. After completion of the reaction, the resulting maleinized polybutadiene was dissolved in xylene to make a solid content of 60% and measured for viscosity at 25° C. by means of the E-type viscometer.

The results are shown in Table 6 wherein the results from the maleinization reactions carried out with copper naphthenate as the gelation inhibitor or without any gelation inhibitor are also indicated for comparison. When the gelation inhibitor was not used, the reaction Table 5

| | Maleic anhydride | | Gelation inhibitor | | | | conversion of maleic anhydride (%) | Solubility in toluene |
|---|---|---|---|---|---|---|---|---|
| Run No. | Amount (g) | Weight % in the reaction mass | Kind | Amount (g) | Weight % in reaction mass | Viscosity (cp, 25° C.) | | |
| 1 | 20.5 | 17 | Iron naphthenate | 0.48 | 0.40 | 860 | 99 | Completely dissolved |
| Reference No. 1 | 20.5 | 17 | None | — | — | 2450 | 99 | Completely dissolved |

EXAMPLE 6

Maleinization reaction was carried out under the same conditions as in Example 1 except that the liquid mass gelled 3 hours after the initiation of the reaction and adhered to the stirrer. After the gel was once formed, it was no longer soluble in xylene.

From Table 6, it is apparent that the gelation inhibitors according to the present invention have a higher viscosity reducing effect than copper naphthenate.

Table 6

| Run No. | Gelation inhibitor Kind | Weight % in the maleinized product | Weight of metal atom (ppm)[1] | Viscosity in solution (cp, 25° C.) 3 hrs. | 4 hrs. | 5 hrs. | Conversion of maleic ahydride (%) 3 hrs. | 4 hrs. | 5 hrs. |
|---|---|---|---|---|---|---|---|---|---|
| 1 | Iron naphthenate | 0.363 | 306 | 614 | 888 | 1050 | 97.3 | 99.0 | 99.9 |
| 2 | Iron naphthenate | 0.073 | 61 | — | — | — | 96.7 | 99.2 | 99.9 |
| 3 | Ferric chloride[2] | 0.0253 | 35 | 367 | 418 | 481 | 98.1 | 99.9 | 99.9 |
| Reference No. 1 | None | — | — | gelation | — | — | — | — | — |
| Reference No. 2 | Copper naphthenate | 0.421 | 306 | 804 | 1229 | 1423 | 97.6 | 99.3 | 99.9 |
| Reference No. 3 | Hydroquinone | 0.421 | — | gelation | — | — | — | — | — |

Note: [1]The weight of the metal atom is indicated by the amount of the metal compound in the liquid polybutadiene in terms of the metal atom (ppm).
[2]The ferric chloride means anhydrous ferric chloride, and it was dissolved in methyl ethyl ketone to make a concentration of 0.05 g/ml and used for the reaction.

EXAMPLE 7

Thirty grams of a liquid polyisoprene having the following physical properties, 7.5 g of maleic anhydride and a designed amount of the gelation inhibitor were charged in a flask:

| Molecular weight | | 450 |
|---|---|---|
| Viscosity (cp, 30° C.) | | 110 |
| Iodine value | | 400 |
| Micro-structure (%) | cis-1,4 structure | 34 |
| | trans-1,4 structure | 41 |
| | 3,4-structure | 24.0 |
| | 1,2-structure | 1.0 |

After replacing the air by nitrogen gas, the mixture was heated at 190° C. for 5 hours with stirring. Thereafter, the resulting maleinized polyisoprene was diluted with xylene to make a solid content of 75%, and the resulting solution was measured for viscosity at 25° C. by means of the E-type viscometer.

The results are shown in Table 7.

Table 7

| Run No. | Gelation Inhibitor Name | Amount used on the polymer) | Viscosity in solution (cp, 25° C.) | Conversion of maleic anhydride (%) |
|---|---|---|---|---|
| 1 | N-Phenyl-α-naphthylamine | 200 | 480 | 99.9 |
| Reference No. 1 | None | — | 940 | 99.9 |

EXAMPLE 8

Fifteen grams of the liquid polyisoprene as in Example 7, 15 g of a liquid polybutadiene having a high content of the 1,2-structure (i.e., the one having a number average molecular weight of 1,000 and consisting of 92% of the 1,2-structure and 8% of the trans-1,4 structure), 7.5 g of maleic anhydride and a designed amount of the gelation inhibitor were charged in a flask. After replacing the air by nitrogen gas, the mixture was heated at 190° C. for 5 hours with stirring. The resulting maleinized product was diluted with xylene to make a solid content of 75%, and the resultant xylene solution was measured for viscosity at 25° C. by means of the E-type viscometer.

The results are shown in Table 8.

Table 8

| Run No. | Gelation Inhibitor Name | Amount used on the polymer) | Viscosity in solution (cp, 25° C.) | Conversion of maleic anhydride (%) |
|---|---|---|---|---|
| 1 | N-Phenyl-α-naphthylamine | 200 | 1080 | 99.9 |
| Reference No. 1 | None | — | 1800 | 99.9 |

What is claimed is:

1. A process for the production of the maleic anhydride adducts of a liquid polymer having a maleic anhydride addition amount of 2 to 70% by weight, which comprises reacting a liquid polymer having a molecular weight of 150 to 5,000 and a viscosity of 2 to 50,000 centipoise at 30° C., said liquid polymer being selected from the group consisting of liquid polybutadienes, liquid polyisoprenes and liquid copolymers comprising units of butadiene or isoprene and units of at least one compound selected from the group consisting of other diolefins, olefins and aromatic vinyl compounds, with maleic anhydride in the presence of at least one compound, as a gelatin inhibitor, selected from the group consisting of:

(a) organic salts of iron, organic complexes of iron, chelate compounds of iron and inorganic compounds of iron;

(b) chlorides, bromides and iodides of the elements belonging to Groups (III), (IV), (V) or (VI) of the Periodic Table, and ether complexes, ester complexes and aldehyde complexes thereof; and (c) alkyl metal halides of the formula:

$$R_nM'Y_{m-n}$$

wherein M' is a metal belonging to Group (III) or (IV) of the Periodic Table, R is alkyl having 1 to 8 carbon atoms, Y is chlorine, bromine or iodine, m is an atomic valence of the metal M′, and n is a positive integer smaller than m.

2. A method according to claim 1, wherein the gelation inhibitor is an organic salt of iron.

3. A method according to claim 2, wherein the organic acid salt of iron is a carboxylic acid salt of iron.

4. A method according to claim 1, wherein the gelation inhibitor is an organic complex or chelate of iron.

5. A method according to claim 4, wherein the organic complex or chelate of iron is tris-(dipyridyl)iron chloride, bis-(ethylenediamine)iron sulfate, bis-(acetylacetonate)iron, bis-(ethylacetoacetate)iron, bis-(dimethylglyoximate)iron or the complex between iron chloride and pyridine.

6. A method according to claim 2, wherein the organic salt of iron is iron acetate, iron naphthenate, iron octylate or iron benzoate.

7. A method according to claim 1, wherein the gelation inhibitor is an inorganic acid salt of iron.

8. A method according to claim 7, wherein the inorganic acid salt of iron is iron sulfate, iron nitrate, ferrous chloride, ferric chloride, ferrous bromide, ferric bromide or iron iodide.

9. A method according to claim 1, wherein the gelation inhibitor is the chloride, bromide or iodide of an element belonging to Group (III), (IV), (V) or (VI) of the Periodic Table, or an ether complex, ester complex or aldehyde complex thereof.

10. A method according to claim 9, wherein the element is phosphorus, boron, aluminum or titanium.

11. A method according to claim 9, wherein the complex is the ether complex, ester complex or aldehyde complex of boron trichloride, aluminum trichloride, titanium tetrachloride, phosphorus trichloride, phosphorus pentachloride, phosphorus tribromide, phosphorus pentabromide, boron tribromide, boron triiodide, aluminum tribromide, titanium tetrabromide or titanium tetraiodide.

12. A method according to claim 1, wherein the gelation inhibitor is said alkyl metal halide of the formula:

$$R_n M' Y_{m-n}$$

in which M′ is aluminum, boron or tin.

13. A method according to claim 1, wherein the amount of gelation inhibitor is 0.001 to 5% by weight based on the liquid polymer.

14. A method according to claim 13, wherein the amount of gelation inhibitor is 0.005 to 0.5% by weight based on the liquid polymer.

15. A method according to claim 1, wherein the addition reaction is carried out at 120° to 230° C. for 1 to 10 hours.

16. A method according to claim 15, wherein the reaction temperature is 160° to 190° C.

UNITED STATES PATENT AND TRADEMARK OFFICE
CERTIFICATE OF CORRECTION

PATENT NO. : 4,161,571
DATED : July 17, 1979
INVENTOR(S) : Seimei YASUI et al

It is certified that error appears in the above-identified patent and that said Letters Patent are hereby corrected as shown below:

IN THE HEADING:

Under [30] Foreign Application Priority Data, add the following:

--Oct. 22, 1975 [JP] Japan .................. 50-127800
Nov. 8, 1975 [JP] Japan .................. 50-134315
Feb. 16, 1976 [JP] Japan .................. 51-16269
Aug. 4, 1976 [JP] Japan .................. 51-93454--

Signed and Sealed this

Twentieth Day of November 1979

[SEAL]

Attest:

RUTH C. MASON
Attesting Officer

LUTRELLE F. PARKER
Acting Commissioner of Patents and Trademarks